United States Patent [19]

Shinohara et al.

[11] Patent Number: 5,351,237
[45] Date of Patent: Sep. 27, 1994

[54] NETWORK SYSTEM COMPRISING A PLURALITY OF LANS CONNECTED TO AN ISDN VIA A PLURALITY OF ROUTERS, EACH CAPABLE OF AUTOMATICALLY CREATING A TABLE FOR STORING ROUTER INFORMATION

[75] Inventors: Takahiro Shinohara, Tokyo; Yuji Ito, Shizuoka, both of Japan

[73] Assignee: NEC Corporation, Japan

[21] Appl. No.: 71,776

[22] Filed: Jun. 4, 1993

[30] Foreign Application Priority Data

Jun. 5, 1992 [JP] Japan .................. 4-145905

[51] Int. Cl.[5] ............................................. H04L 12/56
[52] U.S. Cl. ..................................... 370/58.3; 370/60; 370/94.3; 370/110.1; 379/220
[58] Field of Search ................. 370/16, 58.2, 60, 94.1, 370/94.3, 110.1, 85.13, 58.3; 379/220, 221

[56] References Cited

U.S. PATENT DOCUMENTS

| | | | |
|---|---|---|---|
| 4,764,919 | 8/1988 | Hunter et al. | 370/60 |
| 5,142,531 | 8/1992 | Kirby | 370/94.3 |
| 5,179,558 | 1/1993 | Thacker et al. | 370/94.3 |
| 5,182,751 | 1/1993 | Bales et al. | 370/110.1 |

*Primary Examiner*—Benedict V. Safourek
*Attorney, Agent, or Firm*—Ostrolenk, Faber, Gerb & Soffen

[57] ABSTRACT

In a network system including a plurality of LANs connected to an ISDN via a plurality of routers each of which includes a table for router information, each router sets local router information and main/sub setting information. Each sub-router sets main router information which is written in said table. Each sub-router sends an enquiry packet including the local router information to the main router. The main router receives the enquiry packet, enters the local router information in the table, and sends, to each sub-router, a reply packet including the local router information stored in the table. Each sub-router receives the reply packet and enters the local router information in the table. On the basis of the router information stored in the table, each router renews routing information.

4 Claims, 6 Drawing Sheets

|  | | ROUTER A | ROUTER B | ROUTER C |
|---|---|---|---|---|
| MAIN ROUTER INFORMATION | IP ADDRESS | 133.200.40.3 | 133.200.40.3 | — |
| | TELEPHONE NUMBER | 03 (3455) 3333 | 03 (3455) 3333 | — |
| LOCAL ROUTER INFORMATION | IP ADDRESS | 133.200.40.1 | 133.200.40.2 | 133.200.40.3 |
| | TELEPHONE NUMBER | 045 (400) 1111 | 044 (455) 2222 | 03 (3455) 3333 |
| MAIN/SUB SETTING INFORMATION | | SUB | SUB | MAIN |

FIG. 3

|  | ROUTER A | ROUTER B | ROUTER C |
|---|---|---|---|
| ENTRY 1 — IP ADDRESS | 133.200.40.2 | 133.200.40.1 | 133.200.40.1 |
| ENTRY 1 — TELEPHONE NUMBER | 044 (455) 2222 | 045 (400) 1111 | 045 (400) 1111 |
| ENTRY 2 — IP ADDRESS | — | — | 133.200.40.2 |
| ENTRY 2 — TELEPHONE NUMBER | — | — | 044 (455) 2222 |

ROUTING TABLE IN ROUTER A
321

| IP ADDRESS FIELD 321-1 | NET MASK FIELD 321-2 | NEXT GATEWAY FIELD 321-3 | HOP NUMBER FIELD 321-4 | OUTPUT INTERFACE FIELD 321-5 |
|---|---|---|---|---|
| 133.200.10.10 | 255.255.255.0 | — | 0 | 133.200.10.1 |
| 133.200.10.xx | 255.255.255.0 | — | 0 | 133.200.10.1 |
| 133.200.11.10 | 255.255.255.0 | — | 0 | 133.200.11.1 |
| 133.200.11.xx | 255.255.255.0 | — | 0 | 133.200.11.1 |

FIG. 5(b)

ROUTING TABLE IN ROUTER B
321

| IP ADDRESS FIELD 321-1 | NET MASK FIELD 321-2 | NEXT GATEWAY FIELD 321-3 | HOP NUMBER FIELD 321-4 | OUTPUT INTERFACE FIELD 321-5 |
|---|---|---|---|---|
| 133.200.20.20 | 255.255.255.0 | — | 0 | 133.200.20.2 |
| 133.200.20.xx | 255.255.255.0 | — | 0 | 133.200.20.2 |
| 133.200.21.20 | 255.255.255.0 | — | 0 | 133.200.21.2 |
| 133.200.21.xx | 255.255.255.0 | — | 0 | 133.200.21.2 |

FIG. 5(c)

ROUTING TABLE IN ROUTER C
321

| IP ADDRESS FIELD 321-1 | NET MASK FIELD 321-2 | NEXT GATEWAY FIELD 321-3 | HOP NUMBER FIELD 321-4 | OUTPUT INTERFACE FIELD 321-5 |
|---|---|---|---|---|
| 133.200.30.30 | 255.255.255.0 | — | 0 | 133.200.30.3 |
| 133.200.30.xx | 255.255.255.0 | — | 0 | 133.200.30.3 |
| 133.200.31.30 | 255.255.255.0 | — | 0 | 133.200.31.3 |
| 133.200.31.xx | 255.255.255.0 | — | 0 | 133.200.31.3 |

ROUTING TABLE IN ROUTER A

FIG. 6(a)

| IP ADDRESS FIELD (321-1) | NET MASK FIELD (321-2) | NEXT GATEWAY FIELD (321-3) | HOP NUMBER FIELD (321-4) | OUTPUT INTERFACE FIELD (321-5) |
|---|---|---|---|---|
| 133.200.10.10 | 255.255.255.0 | — | 0 | 133.200.10.1 |
| 133.200.10.xx | 255.255.255.0 | — | 0 | 133.200.10.1 |
| 133.200.11.10 | 255.255.255.0 | — | 0 | 133.200.11.1 |
| 133.200.11.xx | 255.255.255.0 | — | 0 | 133.200.11.1 |
| 133.200.20.0 | 255.255.255.0 | 133.200.40.2 | 1 | 133.200.40.1 |
| 133.200.21.0 | 255.255.255.0 | 133.200.40.2 | 1 | 133.200.40.1 |
| 133.200.30.0 | 255.255.255.0 | 133.200.40.3 | 1 | 133.200.40.1 |
| 133.200.31.0 | 255.255.255.0 | 133.200.40.3 | 1 | 133.200.40.1 |

ROUTING TABLE IN ROUTER B

FIG. 6(b)

| IP ADDRESS FIELD (321-1) | NET MASK FIELD (321-2) | NEXT GATEWAY FIELD (321-3) | HOP NUMBER FIELD (321-4) | OUTPUT INTERFACE FIELD (321-5) |
|---|---|---|---|---|
| 133.200.20.20 | 255.255.255.0 | — | 0 | 133.200.20.2 |
| 133.200.20.xx | 255.255.255.0 | — | 0 | 133.200.20.2 |
| 133.200.21.20 | 255.255.255.0 | — | 0 | 133.200.21.2 |
| 133.200.21.xx | 255.255.255.0 | — | 0 | 133.200.21.2 |
| 133.200.10.0 | 255.255.255.0 | 133.200.40.1 | 1 | 133.200.40.2 |
| 133.200.11.0 | 255.255.255.0 | 133.200.40.1 | 1 | 133.200.40.2 |
| 133.200.30.0 | 255.255.255.0 | 133.200.40.3 | 1 | 133.200.40.2 |
| 133.200.31.0 | 255.255.255.0 | 133.200.40.3 | 1 | 133.200.40.2 |

ROUTING TABLE IN ROUTER C

FIG. 6(c)

| IP ADDRESS FIELD (321-1) | NET MASK FIELD (321-2) | NEXT GATEWAY FIELD (321-3) | HOP NUMBER FIELD (321-4) | OUTPUT INTERFACE FIELD (321-5) |
|---|---|---|---|---|
| 133.200.30.30 | 255.255.255.0 | — | 0 | 133.200.30.3 |
| 133.200.30.xx | 255.255.255.0 | — | 0 | 133.200.30.3 |
| 133.200.31.30 | 255.255.255.0 | — | 0 | 133.200.31.3 |
| 133.200.31.xx | 255.255.255.0 | — | 0 | 133.200.31.3 |
| 133.200.10.0 | 255.255.255.0 | 133.200.40.1 | 1 | 133.200.40.3 |
| 133.200.11.0 | 255.255.255.0 | 133.200.40.1 | 1 | 133.200.40.3 |
| 133.200.20.0 | 255.255.255.0 | 133.200.40.2 | 1 | 133.200.40.3 |
| 133.200.21.0 | 255.255.255.0 | 133.200.40.2 | 1 | 133.200.40.3 |

NETWORK SYSTEM COMPRISING A PLURALITY OF LANS CONNECTED TO AN ISDN VIA A PLURALITY OF ROUTERS, EACH CAPABLE OF AUTOMATICALLY CREATING A TABLE FOR STORING ROUTER INFORMATION

BACKGROUND OF THE INVENTION

This invention relates to a network system comprising a plurality of LANs (Local Area Networks) connected to an ISDN (Integrated Services Digital Network) via a plurality of routers.

In such a network system, each router is for use in connecting the LANs. Each router has a table for storing router information in connection with all of other routers except for the router in question. Each router is assigned with a router IP (Internet Protocol) address and a router telephone number. The router information indicates the router IP address and the router telephone number. Each router connects the corresponding LAN with another LAN through the ISDN by converting the router IP address specifying the other LAN into the router telephone number for the other LAN referring to the table. In order to connect among the LANs via the ISDN, each router must have the table storing the router information in connection with all of other routers except for the router in question, as mentioned before. It is assumed that a new router is added to the network system in order to connect the ISDN and a new LAN. In this event, each router must have the table storing the router information which is manually reset in prior art.

SUMMARY OF THE INVENTION:

It is therefore an object of this invention to provide a network system comprising a plurality of LANs connected to an ISDN via a plurality of routers, each of which is capable of automatically creating a table for storing router information even if a new router is added to the network system.

Other objects of this invention will become clear as the description proceeds.

On describing the gist of an aspect of this invention, it is possible to understand that a network system comprises a plurality of LANs (Local Area Networks) connected to an ISDN (Integrated Services Digital Network) via first through N-th routers where N represents a predetermined natural number which is not less than three and which is not greater than the number of the LANs. The LANs are divided into first through N-th LAN groups which are connected to the first through the N-th routers, respectively. Each of the first through the N-th LAN groups comprises at least one of the LANs. An n-th router is for connecting an n-th LAN group through the ISDN with an m-th LAN group which is at least one of the first through the N-th LAN groups except for the n-th LAN group, where n represents each of 1 through N. The n-th router has a table for storing router information in connection with all of the first through the N-th routers except for the n-th router.

According to an aspect of this invention, the above-understood n-th router comprises local router information setting means for setting local router information indicative of an n-th router IP (Internet Protocol) address and an n-th router telephone number both of which are assigned to the n-th router, and main/sub setting means for setting n-th main/sub setting information indicating that the n-th router should be operable as either a main router or one of sub-routers, whereby a particular one of the first through the N-th routers is operable as the main router while remaining routers except for the main router are operable as the sub-routers. Each of the sub-routers comprises main router information setting means for setting main router information indicative of a main router IP address and a main router telephone number both of which are assigned to the main router. Connected to the main router information setting means and the table, main router information writing means writes the main router information in the table. Each of the sub-routers comprises enquiry packet sending means, connected to the local router information setting means and the table, for sending an enquiry packet including the local router information to the main router on the basis of the main router information stored in the table. The main router comprises enquiry packet receiving means for receiving the enquiry packet from each of the sub-routers, main entering means, connected to the enquiry packet receiving means and the table, for entering the local router information included in the enquiry packet in the table, and reply packet sending means, connected to the table, for sending each of the sub-routers a reply packet including the local router information stored in the table. Each of the sub-routers further comprises reply packet receiving means for receiving the reply packet from the main router and local entering means, connected to the reply packet receiving means and the table, for entering the local router information included in the reply packet in the table.

BRIEF DESCRIPTION OF THE DRAWING

FIGS. 6(a)–6(c) show contents stored in routing tables for use in the routers illustrated in FIG. 2 shown in FIG. 4 after the IP address/telephone number tables are created.

DESCRIPTION OF THE PREFERRED EMBODIMENT

Figure 1:
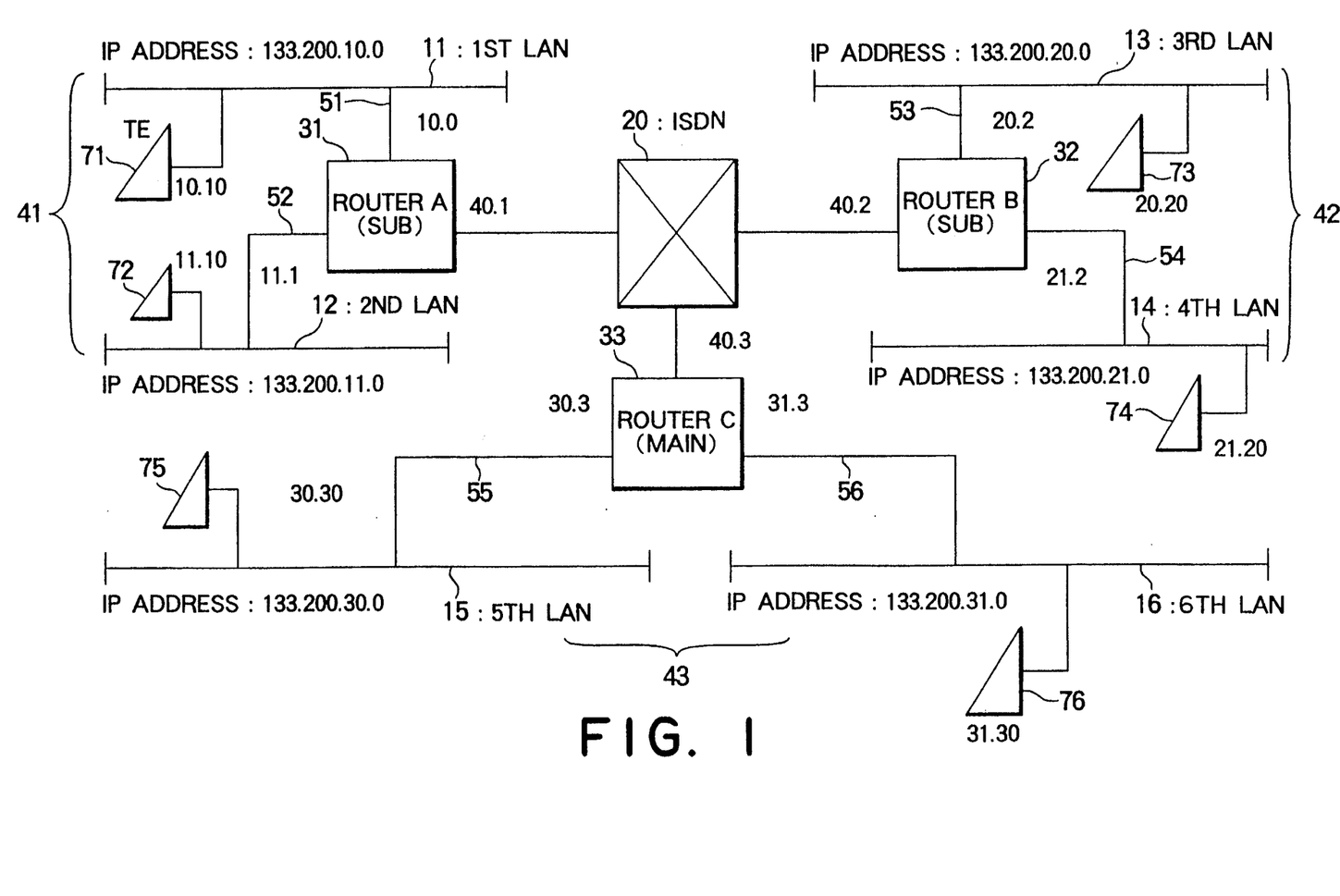
FIG. 1 shows a block diagram of a network system according to a preferred embodiment of this invention.

Referring to FIG. 1, description will begin with a network system according to a preferred embodiment of the present invention. The network system comprises a plurality of LANs (Local Area Networks). In the illustrated example, the LANs are equal in number to six and are called first through sixth LANs 11, 12, 13, 14, 15, and 16. The first through the sixth LANs 11 to 16 are connected to an ISDN (Integrated Services Digital Network) 20 via first through N-th routers where N represents a predetermined natural number which is not less than three and which is not greater than the number of the LANs. In the illustrated example, the predetermined natural number N is equal to three. The first through the third routers are depicted at 31, 32, and 33. Herein, the first through the third routers 31 to 33 are called a router A, a router B, and a router C, respectively.

The first through the sixth LANs 11 to 16 are divided into first through third LAN groups 41, 42, and 43 which are connected to the first through the third routers 31 to 33, respectively. Each of the first through the third LAN groups 41 to 43 comprises at least one of the first through the sixth LANs 11 to 16. In the example being illustrated, the first and the second LANs 11 and 12 belong to the first LAN group 41, the third and the fourth LANs 13 and 14 belong to the second LAN group 42, and the fifth and the sixth LANs 15 and 16 belong to the third LAN group 43. An n-th router 3n is for connecting an n-th LAN group 4n through the ISDN 20 with an m-th LAN group 3m which is at least one of the first through the third LAN groups 41 to 43 except for the n-th LAN group 4n, where n represents each of 1 through 3.

The n-th router 3n is assigned with an n-th router IP (Internet Protocol) address and an n-th router telephone number. The n-th router 3n includes an IP address/telephone number table (later illustrated) for storing router information in connection with all of the first through the third routers 31 to 33 except for the n-th router 3n. The router information indicates the router IP address and the router telephone number. In the example being illustrated, the first router 31 (router A) is assigned with a first router IP address of "133.200.40.1" and a first router telephone number of "045(400)1111". The second router 32 (router B) is assigned with a second router IP address of "133.200.40.2" and a second router telephone number of "044(455)2222". The third router 33 (router C) is assigned with a third router IP address of "133.200.40.3" and a third router telephone number of "03(3455)3333".

The first through the sixth LANs 11 to 16 are assigned with first through sixth LAN IP addresses which are identical with "133.200.10.0", "133.200.11.0", "133.200.20.0", "133.200.21.0", "133.200.30.0", and "133.200.31 0", respectively The first and the second LANs 11 and 12 are connected to the first router 31 (router A) through first and second interfaces 51 and 52, respectively. The third and the fourth LANs 13 and 14 are connected to the second router 32 (router B) through third and fourth interfaces 53 and 54, respectively. The fifth and the sixth LANs 15 and 16 are connected to the third router 33 (router C) through fifth and sixth interfaces 55 and 56, respectively. The first through the sixth output interfaces 51 to 56 are assigned with first through sixth interface addresses which are identical with "133.200.10.1", "133.200.11.1", "133.200.20.2", "133.200.21.2", "133.200.30.3" and "133.200.31.3" respectively Each of the first through the sixth LANs 11 to 16 comprises at least one terminal equipment (TE). In the example being illustrated, the first through the sixth LANs 11 to 16 comprise first through sixth terminal equipments 71, 72, 73, 74, 75, and 76, respectively. The first through the sixth terminal equipments 71 to 76 are assigned with first through sixth terminal IP addresses which are identical with "133.200.10.10", "133.200.11.10", "133.200.20.20", "133.200.21.20", "133.200.30.30",and "133.200.31.30", respectively.

Figure 2:
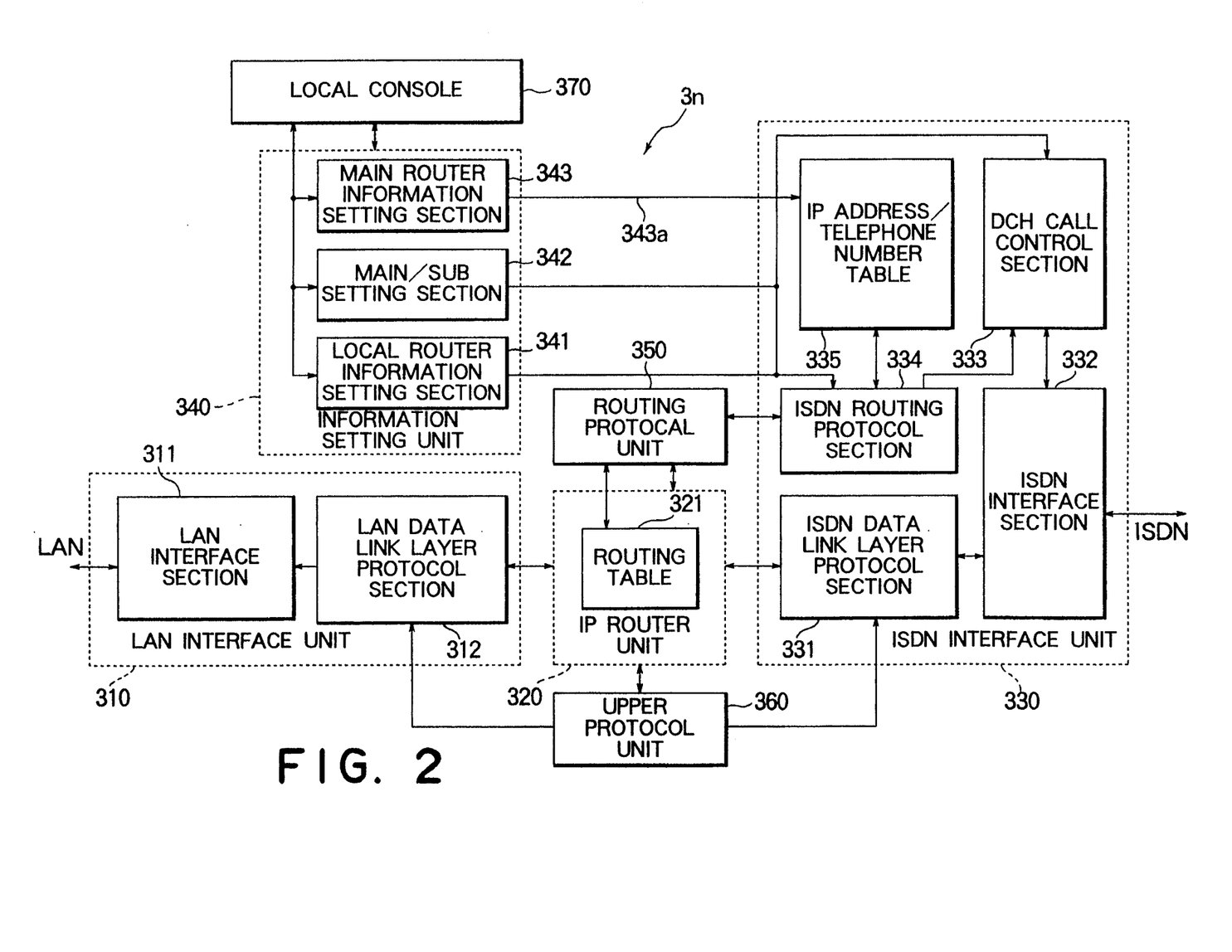
FIG. 2 shows a block diagram of a router for use in the network system according to the preferred embodiment of this invention.

Turning to FIG. 2, the n-th router 3n comprises an LAN interface unit 310, an IP router unit 320, an ISDN interface unit 330, an information setting unit 340, a routing protocol unit 350, an upper protocol unit 360, and a local console 370.

The LAN interface unit 310 is connected to the LAN through the interface. The LAN interface unit 310 comprises an LAN interface section 311 and an LAN data link layer protocol section 312. The LAN interface section 311 meets specifications standardized by, for example, Ethernet, IEEE802.3 CSMA/CD, IEEE802.4 Token-Passing Bus, IEEE802.5 Token Ring, or the like. The LAN data link layer protocol section 312 is connected to the LAN interface section 311, the IP router unit 320, and the upper protocol unit 360. The LAN data link layer protocol section 312 carries out processing of data link layer for LAN. The LAN data link layer protocol section 312 is prescribed by, for instance, IEEE802.2 Logical Link Control (LLC) or the like.

The IP router unit 320 is connected to the LAN interface unit 310, the ISDN interface unit 330, the routing protocol unit 350, and the upper protocol unit 360. The IP router unit 320 comprises a routing table 321 for routing. The IP router unit 320 is prescribed by, for example, RFC1009 or the like.

The ISDN interface unit 330 is connected to the ISDN 20 (FIG. 1) and comprises an ISDN data link layer protocol section 331, an ISDN interface section 332, a Dch call control section 333, an ISDN routing protocol section 334, and the IP address/telephone number table depicted at 335. The ISDN interface section 332 is connected to the ISDN 20. The ISDN interface section 332 is recommended by, for example, CCITT (International Telegraph and Telephone Consultive Committee) Recommendation I.430 or the like. The Dch call control section 333 is connected to the ISDN interface section 332, the ISDN routing protocol section 334, and the information setting unit 340. The Dch call control section 333 carries out call control on D channel, which is well known in the art, through the ISDN interface section 332. The Dch call control section 333 is recommended by, for instance, CCITT Recommendation Q.931 or the like. The ISDN data link layer protocol section 331 is connected to the ISDN interface section 332, the upper protocol unit 360, and the IP router unit 320. The ISDN data link layer protocol section 331 carries out processing of data link for ISDN 20. The ISDN data link layer protocol section 331 is recommended by, for instance, CCITT Recommendation V.110, CCITT Recommendation X.25 (HDLC), PPP, or the like.

The IP address/telephone number table 335 is a table for storing the router information in connection with all of the first through the third routers 31 to 33 except for the n-th router 3n as described above and in the manner which will later be described. The ISDN routing protocol section 334 is connected to the IP address/telephone number table 335, the Dch call control section 333, the routing protocol unit 350, and the information setting unit 340. The ISDN routing protocol section 334 carries out routing processing through the ISDN interface section 332 in the manner which will later be described.

The information setting unit 340 is connected to the local console 370 and the ISDN interface unit 330 and comprises a local router information setting section 341, a main/sub setting section 342, and a main router information setting section 343. The local router information setting section 341 is for setting local router information indicative of the n-th router IP address and the n-th router telephone number both of which are assigned to the n-th router 3n and is for storing the local router information therein. The local router information setting section 341 supplies the local router information therein to the Dch call control section 333 and to the ISDN routing protocol section 334.

The main/sub setting section 342 is for setting n-th main/sub setting information indicating that the n-th router 3n should be operable as either a main router or one of sub-routers and is for storing the n-th main/sub setting information therein. The main/sub setting section 342 supplies the n-th main/sub setting information therein to the Dch call control section 333 and to the ISDN routing protocol section 334. A particular one of the first through the third routers 31 to 33 is operable as the main router while remaining routers except for the main router are operable as the sub-routers.

When the n-th router 3n is set as one of the sub-routers by the main/sub setting section 342, the main router information setting section 343 is for setting main router information indicative of a main router IP address and a main router telephone number both of which are assigned to the main router and is for storing the main router information therein. The main router information setting section 343 supplies the main router information therein to the IP address/telephone number table 335 through a signal line 343a. The main router information is written in the IP address/telephone number table 335 via the signal line 343a. That is, the signal line 343a serves as a main router information writing arrangement for writing the main router information in the IP address/telephone number table 335.

The routing protocol unit 350 is connected to the IP router unit 320 and the ISDN routing protocol section 334. As well known in the art, the routing protocol unit 350 renews the routing table 321. The routing protocol unit 350 is prescribed by, for instance, RIP (Routing Information Protocol), OSPF (RFC904, 809), or the like.

The upper protocol unit 360 is connected to the LAN data link layer protocol section 312, the ISDN data link layer protocol section 331, and the IP router unit 320. The upper protocol unit 360 carries out processing on data included in a packet. The upper protocol unit 360 is prescribed by, for example, TCP (Transmission Control Protocol), UDP (User Datagram Protocol), or the like.

Figure 3:
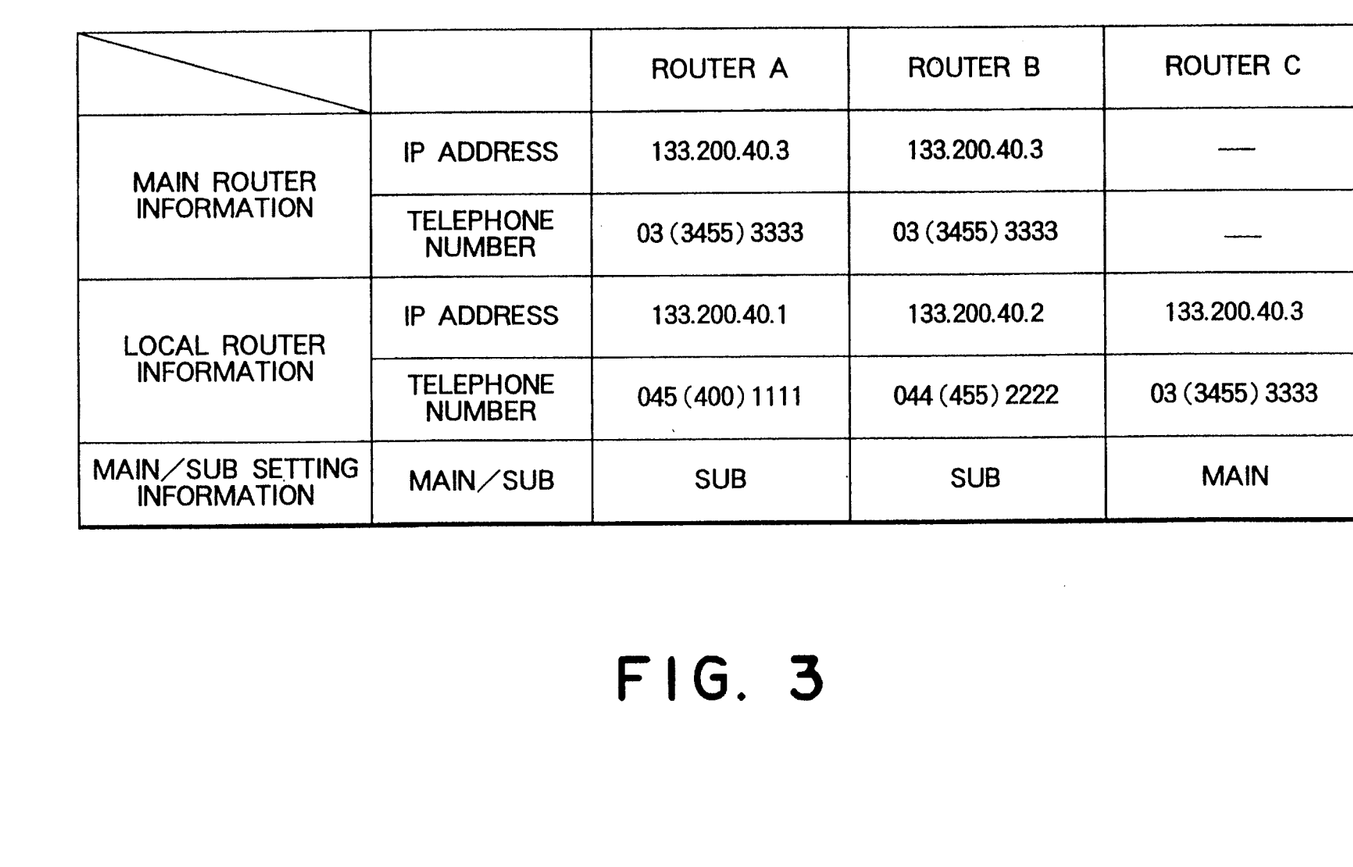
FIG. 3 shows information set by information setting units for use in the routers illustrated in FIG. 2.

Referring to FIG. 3, the description will proceed to information setting operation of the first through the third routers 31 to 33 (routers A, B, and C). Initially, setting of the local router information is carried out in the routers A, B, and C. More specifically, the router A writes with the local console 370 thereof a first router information indicative of the first router IP address of "133,200.40.1" and of the first router telephone number of "045(400)1111" on the local router information setting section 341 thereof. The router B writes with the local console 370 thereof a second router information indicative of the second router IP address of "133.200.40.2" and of the second router telephone number of "044(455)2222" on the local router information setting section 341 thereof. The router C writes with the local console 370 thereof a third router information indicative of the third router IP address of "133,200.40.3" and of the third router telephone number of "03(3455)3333" on the local router information setting section 341 thereof.

Subsequently, setting of the main/sub setting information is carried out in the routers A, B, and C. It will be assumed that the first and the second routers 31 and 32 (routers A and B) are operable as the sub-routers and the third router 33 (router C) is operable as the main router. In this event, the router A writes with the local console 370 thereof a first main/sub setting information indicative of the sub-router on the main/sub setting section 342 thereof. The router B writes with the local console 370 thereof a second main/sub setting information indicative of the sub-router on the main/sub setting section 342 thereof. The router C writes with the local console 370 thereof a third main/sub setting information indicative of the main router on the main/sub setting section 342 thereof. As a result, the routers A and B are operable as the sub-routers while the router C is operable as the main router.

Inasmuch as the router A is set as one of the sub-routers, the router A writes with the local console 370 thereof the main router information indicative of the main router IP address of "133.200.40.3" and the main router telephone number of "03(3455)3333" on the main router information setting section 343 thereof. Likewise, the router B writes with the local console 370 thereof the main router information indicative of the main router IP address of "133.200.40.3" and the main router telephone number of "03(3455)3333" on the main router information setting section 343 thereof. Each of the routers A and B writes with the signal line 343a thereof the main router information stored in the main router information setting section 343 thereof on the IP address/telephone number table 335 thereof.

Figure 4:
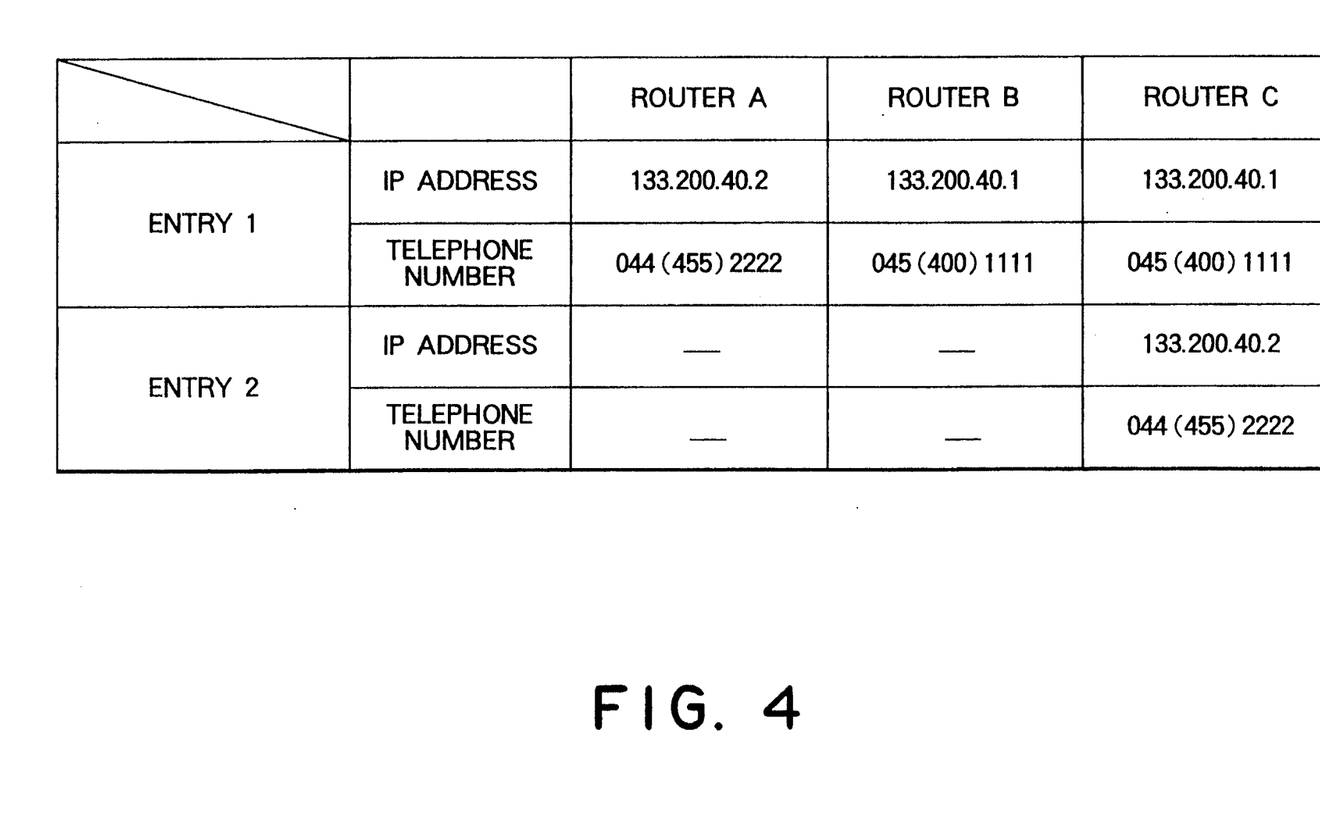
FIG. 4 shows information entered in IP address/telephone number tables for use in the routers illustrated in FIG. 2.

Referring to FIG. 4, the description will proceed to table creating operation of the first through the third routers 31 to 33 (routers A, B, and C).

Initially, each of the routers A and B, both of which act as the sub-routers, sends the local router information to the router C which is operable as the main router.

In particular, the ISDN routing protocol section 334 in the sub-router A confirms by checking the main/sub setting section 342 thereof that the router A is not the main router. The ISDN routing protocol section 334 in the sub-router A delivers the main router telephone number of "03(3455)3333" entered in the IP address/telephone number table 335 to the Dch call control section 333 to make the Dch call control section 333 carry out call for the main router C. The ISDN routing protocol section 334 in the sub-router A generates a first enquiry packet including the first router information indicative of the first router IP address of "133.200.40.1" and of the first router telephone number of "045(400)1111" stored in the local router information setting section 341 to deliver the first enquiry packet to the ISDN interface section 322. The ISDN interface section 322 in the sub-router A sends the first enquiry packet to the main router C via a communication path in the ISDN 20 that is established by the Dch call control section 333.

Similarly, the ISDN routing protocol section 334 in the sub-router B confirms by checking the main/sub setting section 342 thereof that the router B is not the main router. The ISDN routing protocol section 334 in the sub-router B delivers the main router telephone number of "03(3455)3333" entered in the IP address/telephone number table 335 to the Dch call control section 333 to make the Dch call control section 333 carry out call for the main router C. The ISDN routing protocol section 334 in the sub-router B generates a second enquiry packet including the second router information indicative of the second router IP address of "133.200.40.2" and of the second router telephone number of "044(455)2222" stored in the local router information setting section 341 to deliver the second enquiry packet to the ISDN interface section 322. The ISDN interface section 322 in the sub-router B sends the second enquiry packet to the main router C via a communication path in the ISDN 20 that is established by the Dch call control section 333.

As a result, the first and the second router information is sent to the main router C. At any rate, the ISDN routing protocol section 334 in each of the sub-routers A and B acts in cooperation with the Dch call control section 333 and the ISDN interface 332 as an enquiry packet sending arrangement for sending the enquiry packet including the local router information to the main router on the basis of the main router information stored in the IP address/telephone number table 335.

In the main router C, the Dch call control section 333 refers, in response to the call from each of the sub-routers A and B, the IP address/telephone number table 335 to confirm reception of the call where data is not entered therein. After this confirmation, the Dch call control section 333 replies the call to connect the ISDN interface 332 with the ISDN routing protocol section 334. Therefore, the enquiry packet is received in the ISDN routing protocol section 334. The Dch call control section 333 in the main router C serves in cooperation with the ISDN interface section 332 and the ISDN routing protocol section 334 as an enquiry packet receiving arrangement for receiving the enquiry packet from each of the sub-routers A and B.

On reception of the enquiry packet, the ISDN routing protocol section 334 in the main router C confirms that the received enquiry packet includes the local router information for the sub-router which is connected to the ISDN 20. When the received enquiry packet is the first enquiry packet, the ISDN routing protocol section 334 in the main router C enters, in the IP address/telephone number table 335, the first router information indicative of the first router IP address of "133.200.40.1" and of the first router telephone number of "045(400)1111" included in the first enquiry packet. When the received enquiry packet is the second enquiry packet, the ISDN routing protocol section 334 in the main router C enters, in the IP address/telephone number table 335, the second router information indicative of the second router IP address of "133.200.40.2" and of the second router telephone number of "044(455)2222" included in the second enquiry packet. At any rate, the ISDN routing protocol section 334 in the main router C acts as a main entering arrangement for entering the local router information included in the enquiry packet in the IP address/telephone number table 335. After completion of such an entry of the local router information, the ISDN routing protocol section 334 in the main router C disconnects the communication path in the ISDN 20 between the main router C and each of the sub-routers A and B to confirm absence of the local router information for a new sub-router connected to the ISDN 20.

After such a confirmation, the ISDN routing protocol section 334 in the main router C delivers the first router telephone number of "045(400)1111" entered in the IP address/telephone number table 335 to the Dch call control section 333 to make the Dch call control section 333 carry out call for the sub-router A. The ISDN routing protocol section 334 in the main router C generates a first reply packet including the second router information indicative of the second router IP address of "133.200.40.2" and of the second router telephone number of "044(455)2222" entered in the IP address/telephone number table 335 to deliver the first reply packet to the ISDN interface section 332. The ISDN interface section 322 in the main router C sends the first reply packet to the sub-router A via a communication path in the ISDN 20 that is established by the Dch call control section 333.

Subsequently, the ISDN routing protocol section 334 in the main router C delivers the second router telephone number of "044(455)2222" entered in the IP address/telephone number table 335 to the Dch call control section 333 to make the Dch call control section 333 carry out call for the sub-router B. The ISDN routing protocol section 334 in the main router C generates a second reply packet including the first router information indicative of the first router IP address of "133.200.40.1" and of the first router telephone number of "045(400)1111" entered in the IP address/telephone number table 335 to deliver the second reply packet to the ISDN interface section 322. The ISDN interface section 322 in the main router C sends the second reply packet to the sub-router B via a communication path in the ISDN 20 that is established by the Dch call control section 333.

Therefore, the first and the second reply packets are sent to the sub-routers A and B, respectively. At any rate, the ISDN routing protocol section 334 in the main router C serves in cooperation with the Dch call control section 333 and the ISDN interface 332 as a reply packet sending arrangement for sending, to each of the sub-routers, the reply packet including the local router information stored in the IP address/telephone number table 335.

In the sub-router A, the Dch call control section 333 replies the call from the main router C to connect the ISDN interface section 332 with th ISDN routing protocol section 334. Therefore, the first reply packet is received in the ISDN routing protocol section 334. The Dch call control section 333 in the first router A serves in cooperation with the ISDN interface section 332 and the ISDN routing protocol section 334 as a first reply packet receiving arrangement for receiving the first reply packet from the main router C.

On reception of the first reply packet, the ISDN routing protocol section 334 in the first router A extracts the second router information indicative of the second router IP address of "133.200.40.2" and of the second router telephone number of "044(455)2222" from the first reply packet to enter the second router information in the IP address/telephone number table 335. At any rate, the ISDN routing protocol section 334 in the first router A acts as a first local entering arrangement for entering the second router information included in the first reply packet in the IP address/telephone number table 335. After completion of such an entry of the second router information, the ISDN routing protocol section 334 in the first router A disconnects the communication path in the ISDN 20 between the first router A and the main router C.

In the second router B, the Dch call control section 333 replies the call from the main router C to connect the ISDN interface 332 with the ISDN routing protocol section 334. Therefore, the second reply packet is received in the ISDN routing protocol section 334. The Dch call control section 333 in the second router A serves in cooperation with the ISDN interface section 332 and the ISDN routing protocol section 334 as a second reply packet receiving arrangement for receiving the second reply packet from the main router C.

On reception of the second reply packet, the ISDN routing protocol section 334 in the second router B extracts the first router information indicative of the first router IP address of "133.200.40.1" and of the first router telephone number of "045(400)1111" from the second reply packet to enter the first router information in the IP address/telephone number table 335. At any rate, the ISDN routing protocol section 334 in the second router B acts as a second local entering arrangement for entering the first router information included in the second reply packet in the IP address/telephone number table 335. After completion of such an entry of the first router information, the ISDN routing protocol section 334 in the second router B disconnects the communication path in the ISDN 20 between the second router B and the main router C.

Accordingly, the routers A, B, and C can create the IP address/telephone number table 335 as shown in FIG. 4.

Figure 5A:
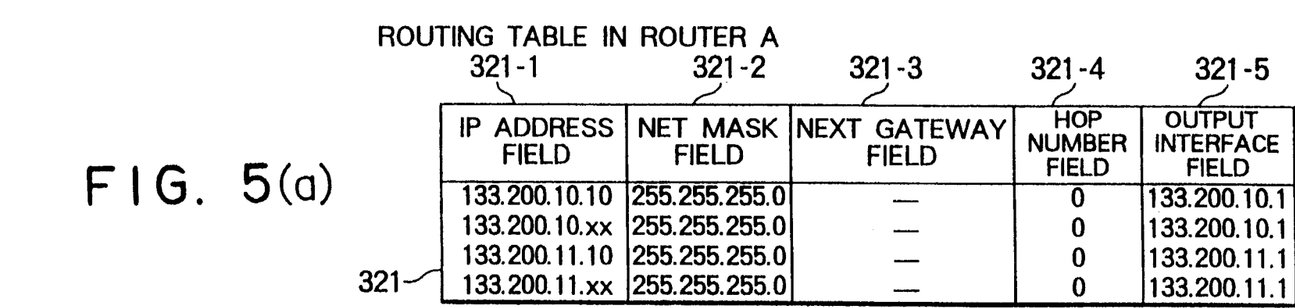
FIGS. 5(a)–5(c) show contents stored in routing tables for use in the routers illustrated in FIG. 2 before the IP address/telephone number tables shown in FIG. 4 are created.
Figure 5B:
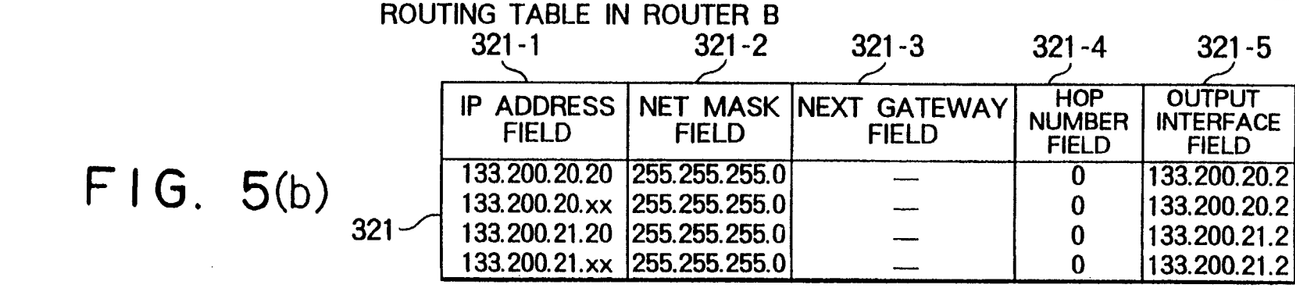
Figure 5C:
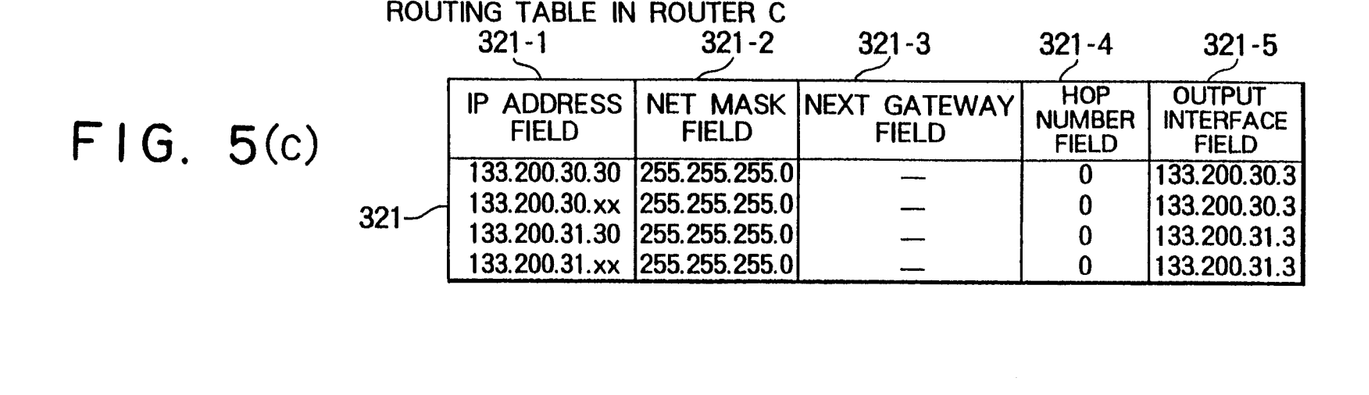

Referring to FIGS. 5(a)-5(c) and 6(a)-6(b), the description will proceed to renewing operation for the routing table 321 in each of the first through the third routers 31 to 33 (routers A, B, and C). In each of the routers A, B, and C, the routing table 321 stores only data as regards the network connected to the router before the IP address/telephone number table 335 is created, as shown in FIGS. 5(a)-5(c). The routing table 321 has a terminal IP address field 321-1 for the terminal IP addresses, a net mask field 321-2 for net mask indicative of network/terminal, a next gateway field 321-3 for a next gateway address indicative of the router IP address for the router to next be connected, a hop number field 321-4 for a hop number indicative of the number of the routers, and an output interface field 321-5 for the output interface address.

In FIG. 5(a), the routing table 321 in the sub-router A has the terminal IP address field 321-1 which stores the first IP terminal address of "133.200.10.10" for the first terminal equipment 71 connected to the first LAN 11, the second terminal IP address of "133.200.11.10" for the second terminal equipment 72 connected to the second LAN 12, and so on. The net mask field 321-2 of the routing table 321 in the sub-router A stores net mask information of "255.255.255.0" where "255" indicates the network and "0"indicates the terminal. The next gateway field 321-3 of the routing table 321 in the sub-router A stores no information because the router IP address for the router to next be connected is not entered yet. The hop number field 321-4 of the routing table 321 in the sub-router A stores the hop number of zero because he first and the second terminal equipments 71 and 72 are included in the first LAN group 41 connected to the sub-router A. The output interface field 321-5 of the routing table 321 in the sub-router A stores the first interface address of "133.200.10.1" for the first output interface 51 connected to the first LAN 11 and the second interface address of "133.200.11.1" for the second output interface 52 connected to the second LAN 12.

In the routing table 321 in the sub-router B (FIG. 5(b), the terminal IP address field 321-1 stores the third IP terminal address of "133.200.20.20" for the third terminal equipment 73 connected to the third LAN 13, the fourth terminal IP address of "133.200.21.20" for the fourth terminal equipment 74 connected to the fourth LAN 14, and so on. The net mask field 321-2 stores net mask information of "255.255.255.0". The next gateway field 321-3 stores no information because the router IP address for the router to next be connected is not entered yet. The hop number field 321-4 stores the hop number of zero because the third and the fourth terminal equipments 73 and 74 are included in the second LAN group 42 connected to the sub-router B. The output interface field 321-5 stores the third interface address of "133.200.20.2" for the third output interface 53 connected to the third LAN 13 and the fourth interface address of "133.200.21.2" for the fourth output interface 54 connected to the fourth LAN 14.

In the routing table 321 in the main router C (FIG.5(c), the terminal IP address field 321-1 stores the fifth IP terminal address of "133.200.30.30" for the fifth terminal equipment 75 connected to the fifth LAN 15, the sixth terminal IP address of "133.200.31.30" for the sixth terminal equipment 76 connected to the sixth LAN 16, and so on. The net mask field 321-2 stores net mask information of "255.255.255.0". The next gateway field 321-3 stores no information because the router IP address for the router to next be connected is not entered yet. The hop number field 321-4 stores the hop number of zero because the fifth and the sixth terminal equipments 75 and 76 are included in the third LAN group 43 connected to the main router C. The output interface field 321-5 stores the fifth interface address of "133.200.30.3" for the fifth output interface 55 connected to the fifth LAN 15 and the sixth interface address of "133.200.31.3" for the sixth output interface 56 connected to the sixth LAN 16.

After the IP address/telephone number table 335 in each of the routers A, B, and C is created as illustrated in FIG. 4, the routing table 321 in each of the routers A, B, and C is renewed by carrying out exchange of routing information among the routers A, B, and C in the manner which will presently be described in connection with FIGS. 6(a)-6(b).

The ISDN routing protocol section 334 in the sub-router A delivers the second router telephone number of "044(455)2222" entered in the IP address/telephone number table 335 to the Dch call control section 333 to make the Dch call control section 333 carry out call for the sub-router B. Responsive to the call from the sub-router A, the Dch call control section 33 in the sub-router B connects the ISDN interface section 332 with the ISDN routing protocol section 334. As a result, the sub-routers A and B are connected to each other. The ISDN routing protocol section 334 in the sub-router A delivers the second router IP address of "133.200.40.2" for the sub-router B to the routing protocol unit 350 in the sub-router A while the ISDN routing protocol section 334 in the sub-router B delivers the first router IP address of "133.200.40.1" for the sub-router A to the routing protocol unit 350 in the sub-router B. Therefore, exchange of the routing information is carried out between the sub-routers A and B, As a result, the routing protocol unit 350 in the sub-router A enters the routing information for the sub-router B in the routing table 321 thereof while the routing protocol unit 350 in the sub-router B enters the routing information for the sub-router A in the routing table 321 thereof.

In the routing table 321 in the sub-router A, the terminal IP address field 321-1 stores the third LAN IP address of "133.200.20.0" for the third LAN 13 and the fourth LAN IP address of "133.200.21.0" for the fourth LAN 14. The net mask field 321-2 stores net mask information of "255.255.255.0". The next gateway field 321-3 stores the second router IP address of "133.200.40.2" for the sub-router B and the hop number field 321-4 stores the hop number of one. The output interface field 321-5 stores the first router IP address of "133.200.40.1" for the sub-router A.

In the routing table 321 in the sub-router B, the terminal IP address field 321-1 stores the first LAN IP address of "133.200.10.0" for the first LAN 11 and the second LAN IP address of "133.200.11.0" for the second LAN 11. The net mask field 321-2 stores net mask information of "255.255.255.0". The next gateway field 321-3 stores the first router IP address of "133.200.40.1" for the sub-router A and the hop number field 321-4 stores the hop number of one. The output interface field 321-5 stores the second router IP address of "133.200.40.2" for the sub-router B.

Similarly, the ISDN routing protocol section 334 in the sub-router A delivers the third or the main router telephone number of "03(3455)3333" entered in the IP address/telephone number table 335 to the Dch call control section 333 to make the Dch call control section 333 carry out call for the main router C. Responsive to the call from the sub-router A, the Dch call control section 33 to the main router C connects the ISDN interface section 332 with the ISDN routing protocol section 334. As a result, the sub-router A and the main router C are connected to each other. The ISDN routing protocol section 334 in the sub-router A delivers the third or the main router IP address of "133.200.40.3" for the main router C to the routing protocol unit 350 in the sub-router A while the ISDN routing protocol section 334 in the main router C delivers the first router IP address of "133.200.40.1" for the sub-router A to the routing protocol unit 350 in the main router C. Therefore, exchange of the routing information is carried out between the sub-router A and the main router B. As a result, the routing protocol unit 350 in the sub-router A enters the routing information for the main router C in the routing table 321 thereof while the routing protocol unit 350 in the main router C enters the routing information for the sub-router A in the routing table 321 thereof.

In the routing table 321 in the sub-router A, the terminal IP address field 321-1 stores the fifth LAN IP address of "133.200.30.0" for the fifth LAN 15 and the sixth LAN IP address of "133.200.31.0" for the sixth LAN 16. The net mask field 321-2 stores net mask information of "255.255.255.0". The next gateway field 321-3 stores the third or the main router IP address of "133.200.40.3" for the main router C and the hop number field 321-4 stores the hop number of one. The output interface field 321-5 stores the first router IP address of "133.200.40.1" for the sub-router A.

In the routing table 321 in the main router C, the terminal IP address field 321-1 stores the first LAN IP address of "133.200.10.0" for the first LAN 11 and the second LAN IP address of "133.200.11.0" for the second LAN 11. The net mask field 321-2 stores net mask information of "255.255.255.0". The next gateway field 321-3 stores the first router IP address of "133.200.40.1" for the sub-router A and the hop number field 321-4 stores the hop number of one. The output interface field 321-5 stores the third or the main router IP address of "133.200.40.3" for the main router C.

Lastly, the ISDN routing protocol section 334 in the sub-router B delivers the third or the main router telephone number of "03(3455)3333" entered in the IP address/telephone number table 335 to the Dch call control section 333 to make the Dch call control section 333 carry out call for the main router C. Responsive to the call from the sub-router B, the Dch call control section 33 in the main router C connects the ISDN interface section 332 with the ISDN routing protocol section 334. As a result, the sub-router B and the main router C are connected to each other. The ISDN routing protocol section 334 in the sub-router B delivers the third or the main router IP address of "133.200.40.3" for the main router C to the routing protocol unit 350 in the sub-router B while the ISDN routing protocol section 334 in the main router C delivers the second router IP address of "133.200.40.2" for the sub-router B to the routing protocol unit 350 in the main router C. Therefore, exchange of the routing information is carried out between the sub-router B and the main router C. As a result, the routing protocol unit 350 in the sub-router B enters the routing information for the main router C in the routing table 321 thereof while the routing protocol unit 350 in the main router C enters the routing information for the sub-router B in the routing table 321 thereof.

In the routing table 321 in the sub-router B, the terminal IP address field 321-1 stores the fifth LAN IP address of "133.200.30.0" for the fifth LAN 15 and the sixth LAN IP address of "133.200.31.0" for the sixth LAN 14. The net mask field 321-2 stores net mask information of "255.255.255.0". The next gateway field 321-3 stores the third or the main router IP address of "133.200.40.3" for the main router C and the hop number field 321-4 stores the hop number of one. The output interface field 321-5 stores the second router IP address of "133.200.40.2" for the sub-router B.

In the routing table 321 in the main router C, the terminal IP address field 321-1 stores the third LAN IP address of "133.200.20.0" for the third LAN 13 and the fourth LAN IP address of "133.200.21.0" for the fourth LAN 14. The net mask field 321-2 stores net mask information of "255.255.255.0". The next gateway field 321-3 stores the second router IP address of "133.200.40.2" for the sub-router B and the hop number field 321-4 stores the hop number of one. The output interface field 321-5 stores the third or the main router IP address of "133.200.40.3" for the main router C.

After the routing table 321 in each of the first through the third routers 31 to 33 is created or is renewed in the manner as described above, it is possible to carry out data communication or data transfer via the ISDN 20 among the first through the sixth terminal equipments 71 to 76 included in the first through the sixth LANs 11 to 16 connected to the first through the third routers 31 to 33.

The description will proceed to operation in a case where data communication is carried out between the first and the fourth terminal equipments 71 and 74. The first terminal equipment 71 transmits a data packet for the fourth terminal equipment 74 to the first router 31 (the router A) through the first LAN 11. In the first router 31, the routing protocol unit 350 searches the routing table 321 for the next gateway address of "133.200.40.2" and the output interface address of "133.200.40.1" as regards the data packet for the fourth terminal equipment 74. Therefore, the first router 31 recognizes that the data packet should be transmitted to the interface of the output interface address of "133.200.40.1". The ISDN routing protocol section 334 in the first router 31 searches the IP address/telephone table 335 for the second router telephone number of "044(455)2222" which corresponds to the next gateway address of "133.200.40.2". The ISDN routing protocol section 334 in the first router 31 delivers the second router telephone number of "044(455)2222" to the Dch call control section 333 to make the Dch call control section 333 carry out a call for the second router 32.

Responsive to the call from the first router 31, the second router 32 completes connection for the call. After completion of the connection for the call, the first router 31 completes negotiation of the data link layer by using the ISDN data link layer protocol section 331. The first router 31 sends the data packet to the ISDN 20. The second router 32 receives the data packet. The second router 32 transmits the data packet to the fourth terminal equipment 74 through the fourth LAN 14. On the other hand, the fourth terminal equipment 74 transmits a data packet to the first terminal equipment 71 through the second router 32, the ISDN 20, and the first router 31 using inverse procedure. As described above, it is possible to carry out data communication between the first terminal equipment 71 and the fourth terminal equipment 74.

As apparent from the description mentioned above, it is possible for this invention to automatically create IP address/telephone number tables in all of routers by only setting main/sub setting information, local router information, and main router information in each router thereby renewing routing information.

While this invention has thus far been described in conjunction with a preferred embodiment thereof, it will readily be possible for those skilled in the art to put this invention into practice in various other manners.

What is claimed is:

1. In a network system comprising a plurality of LANs (Local Area Networks) connected to an ISDN (Integrated Services Digital Network) via first through N-th routers where N represents a predetermined natural number which is not less than three, said LANs being divided into first through N-th LAN groups which are connected to said first through said N-th routers, respectively, each of said first through said N-th LAN groups comprising at least one of said LANs, an n-th router being for connecting an n-th LAN group through said ISDN with at least one of said first through said N-th LAN groups except for said n-th LAN group, where n represents each of 1 through N, said n-th router including a table for storing router information, in connection with all of said first through said N-th routers except for said n-th router, the improvement wherein said n-th router comprises:

local router information setting means for receiving local router setting, information indicative of an n-th router IP (Internet Protocol) address and an n-th router telephone number both of which are assigned to said n-th router; and main/sub setting means for receiving n-th main/sub setting information indicating whether said n-th router should be operable as either a main router or one of sub-routers, whereby a particular one of said first through said N-th routers is operable as said main router while remaining routers except for said main router are operable as said sub-routers.

2. A network system as claimed in claim 1, wherein each of said sub-routers comprises:

main router information setting means for setting main router information indicative of a main router IP address and a main router telephone number both of which are assigned to said main router; and main router information writing means, connected to said main router information setting means and said table, for writing said main router information in said table.

3. A network system as claimed in claim 2, wherein each of said sub-routers comprises enquiry packet sending means, connected to said local router information setting means and said table, for sending an enquiry packet including said local router information to said main router on the basis of said main router information stored in said table, said main router comprising:

enquiry packet receiving means for receiving said enquiry packet from each of said sub-routers;

main entering means, connected to said enquiry packet receiving means and said table, for entering the local router information included in said enquiry packet in said table; and reply packet sending means, connected to said table, for sending, to each of said sub-routers, a reply packet including the local router information stored in said table;

each of said sub-routers further comprising:

reply packet receiving means for receiving said reply packet from said main router; and local entering means, connected to said reply packet receiving means and said table, for entering the local router information included in said reply packet in said table.

4. A method of creating a table included in each of first through N-th routers for connecting a plurality of LANs (Local Area Networks ) via an ISDN ( Integrated Services Digital Network) in a network system where N represents a predetermined natural number which is not less than three, said LANs being divided into first through N-th LAN groups which are connected to said first through said N-th routers, respectively, each of said first through said N-th LAN groups comprising at least one of said LANs, an n-th router being for connecting an n-th LAN group through said ISDN with at least one of said first through said N-th LAN groups except for said n-th LAN group, where n represents each of 1 through N, the table of said n-th router being for storing router information in connection with all of said first through said N-th routers except for said n-th router, said method comprising the steps of:

setting, in said n-th router, local router information indicative of an n-th router IP (Internet Protocol) address and an n-th router telephone number both of which are assigned to said n-th router;

setting, in said n-th router, n-th main/sub setting information indicating that said n-th router should be operable as either a main router or one of sub-routers, whereby a particular one of said first through said N-th routers is operable as said main router while remaining routers except for said main router are operable as said sub-routers;

setting, in each of said sub-routers, main router information indicative of a main router IP address and a main router telephone number both of which are assigned to said main router;

writing, each of said sub-routers, said main router information in said table;

sending, from each of said sub-routers to said main router, an enquiry packet including said local router information on the basis of said main router information stored in said table;

receiving, in said main router, said enquiry packet from each of said sub-routers;

entering, in said main router, the local router information included in said enquiry packet in said table;

sending, from said main router to each of said sub-routers, a reply packet including the local router information stored in said table;

receiving, in each of said sub-routers, said reply packet from said main router; and entering, in each of said sub-routers, the local router information included in said reply packet in said table.

* * * * *